United States Patent Office 3,328,136
Patented June 27, 1967

3,328,136
COMPOSITION FOR PRODUCING HEAT
John P. Verakas, Jr., Fort Lauderdale, Fla., assignor to Verlam Distributors, Inc., a corporation of Florida
No Drawing. Filed Mar. 18, 1964, Ser. No. 352,948
5 Claims. (Cl. 44—3)

This invention relates to a heat producing composition. More particularly it relates to the generation of heat as a result of bringing an aqueous liquid into physical contact with a suitable dry solid powder.

There are many instances in which it would be desirable and useful to have a source of heat available at any desired location including locations where electricity may not be conveniently available e.g. due to a power failure, or where flame combustion may not be allowed. For example, when travelling in a public conveyance it may be desired to warm a baby's bottle; or in a public park it may be desired to keep heated foods warm at a picnic; or it may be desired to provide a hot compress to a wound, for first aid or for the relief of pain; or to thaw a frozen lock or a frozen pipe or valve; or to provide a heating pad for bodily comfort, or any of a multitude of everyday demands for heat in moderate amounts at a specific time and place.

A principal object of this invention is to provide a heat producing composition which is inexpensive, non-toxic, odorless, and which rapidly produces the desired heat without any necessity for air or other combustion aid.

It is a further object of this invention to provide a heat producing composition which is wholly inert when not in use, but which may be immediately converted into a heat producing agent whenever desired.

A further object is to provide a source of heat useful in the event of an electrical power failure or other disaster or where flammables are prohibited.

A further object of the invention is to provide a heat producing composition which can be packaged in any size amounts according to the amount of heat to be used, and which can be stored in air-tight and moisture-proof containers for indefinitely extended periods of time without experiencing any deterioration.

Still a further object of the invention is to provide a heat producing composition which is ready for instant use at any time or place.

These and other objects are accomplished by means of compositions consisting essentially of water and calcined magnesium sulphate (calcined kieserite), which is an anhydrous magnesium sulphate and in which the liquid and solids are kept separated from one another until the heat is to be produced. Other constituents may be added to either the dry powder or to the liquid portion of the composition in order to enhance the same or to impart specific properties to the composition but it is to be understood that in order to provide heat at the time it is required, it is necessary that the dry and liquid portions of the composition be kept separated from one another until the generation of heat is to occur.

For most purposes a preferred ratio of water to calcined magnesium sulphate (calcined kieserite) is about equal parts by weight but these reactive proportions may be varied according to the intensity and duration of the heat to be generated. Thus to lengthen the duration of the interval during which heat is evolved, the amount of water may be diminished to as little as one-half part by weight for each part of anhydrous magnesium sulphate (calcined kieserite) or when a shorter more intensified heat is wanted the relative amount of water may be increased to as much as 2½ times the weight of calcined kieserite, whereby a temperature rise of about 150° F. may be produced.

It has been found possible to obtain an even more intensified heat, and/or heat of a longer duration by adding iron oxide to the calcined magnesium sulphate. The amount of iron oxide that is incorporated with the calcined magnesium sulphate may vary from .05% to 7.5% by weight of the mixture. The iron oxide that is used is thoroughly mixed and blended with the calcined magnesium sulphate for best results.

It has also been found useful to incorporate certain viscous materials into the powder portion of the composition. This viscous agent may serve one or more of several purposes. For example, it assists the composition to retain heat. It gives the composition more body. It helps prevent the crusting of the composition, when same is cooling. It causes the composition to form a non-flowing gel formation, after it has been used and permitted to cool. The last mentioned purpose can be very important in cases where a hot pack is designed to be reused. Substances suitable as the viscous material include the following: carboxymethyl cellulose, other cellulose gums, vermiculite, bentonite, starch gelatin, flour or any other such cold water soluble gum. The proportion used may vary from 2% to 8% depending on consistency desired or results required.

The prevention of early crusting of the composition, while cooling is taking place may be accomplished by the use of small amounts of up to 6% the total amount of the powder portion of the composition of any one of several wetting and/or suspending agents, such as polyethylene glycol or Santomerse or any other wetting or suspending agents. Polyethylene glycol is preferred as the wetting agent and suspending agent because it helps minimize dusting during packaging of the composition and because it appears to prolong the heat.

It is desirable to control the performance of the composition, after it has been activated, e.g. to control of B.t.u. output, the duration of the heating etc. To accomplish this while at the same time given the composition more body, one or more insulating ingredients may be incorporated into the powder portion of the composition. For this purpose I may employ such substances, as powder asbestos, plaster of Paris, sand, sawdust or others, or a mixture of any of them. Proportions of these substances when incorporated into the powder portion of the composition are from 2% to 10%.

In any event the anhydrous magnesium sulphate (calcined kieserite) should constitute not less than 80% by weight of the solids content of the composition.

In summary, then the composition of the powdered solids portion of the heat producing composition of this invention comprises:

|  | Percent | Range if used, percent | Preferred, percent |
|---|---|---|---|
| Red iron oxide* | Up to 7.5 | .05–7.5 | 5 |
| Viscous material,* e.g. gum | Up to 8 | 2–8 | 5 |
| Wetting agent* | Up to 6 | 1–6 | 3 |
| Insulating material* | Up to 10 | 2–10 | 7 |
| Anhydrous MgSO₄ (calcined kieserite) | At least 80 | Balance | Balance |
|  | 100 | 100 | 100 |

*Optional.

The liquid aqueous portion of the composition may also be modified by incorporation therein of one or more substances for different purposes. To add to the appearance of the composition after it has been activated I may employ some sort of a coloring, for example 10 or 15 drops of dye solution for every gallon of water. Further, I may employ common salt or potassium chloride or any such agent in small amounts of 1% to, as much as, 10% and incorporate it in the liquid portion of the composition to give the liquid a lower freezing point; enabling it to remain liquid, if subjected to freezing temperatures.

In summary then the liquid portion of the compositions of this invention comprises:

| | | |
|---|---|---|
| Water | percent | 90-100 |
| Coloring [1] | | A few drops |
| Inorganic salt [1] | percent | 1-10 |

[1] Optional.

A preferred manner of carrying out the invention is to package both components of the composition in the same package, keeping them separated until the heating effect is desired. An example of how this can be accomplished follows.

Suitable amount of the liquid portion of the composition is put inside of a flexible or semi-flexible, but rupturable plastic container, which container is then sealed. This container is inserted inside of another larger flexible or semi-flexible plastic container. Into the larger container there is also placed a predetermined required amount of the powder portion of the composition, and then the larger container is also sealed. When the heat producing composition is to be activated and put to use, sufficient pressure is applied locally to the larger container to cause the inner container to rupture and release the liquid into the powder. A mixing of the two components will produce a rise in temperature, of as much as 155 degrees F. A slow temperature decrease begins to occur between five and twenty-five minutes after activation, the extent of this decrease being dependent on ambient conditions and on the amount and formulation of the composition used. The benefit of a heat effect under certain conditions can be obtained for as much as two hours or more. Meanwhile, the heat produced by the composition can be transmitted to persons or objects by placing them adjacent to the outer container.

Another way to carry out the invention and one which may be more applicable for many such uses as the warming or heating of foods, beverages, baby bottles, etc.; is, as follows: only the powder portion of the composition is packaged in a bag, box or other container. After a predetermined measured amount of the dry solid material is put into the container, the container is closed. When the composition is to be used, the container is opened at one end and the contents, or a portion thereof, is mixed into a suitable amount of water in a suitable vessel which can be placed close to the object to be warmed or heated.

When the composition is to be used to melt ice or snow it is merely broadcast on the ice or snow without any addition of liquid.

In those cases where the powder portion of the composition is packaged and/or delivered without any liquid, it is intended that it be used where water is readily available. The water is to be added to the powder portion of the composition at or near the spot where the composition is to be activated and used in accordance with furnished instructions. One of the many examples for the use of the invention in this manner is, hospitals using it for an immediate hot pack or compress. The powder portion of the composition for use in the form described may be packaged in predetermined measured amounts in some flexible or semi-flexible container made of plastic or some such similar material, the container having a small opening into which the designated necessary amount of water may be poured. The opening is then closed and/or sealed to prevent any of the composition from coming out. The most preferred container for use with the compositions described herein is one with a one-way valve, which permits the entry of a substance into said container and prevents any of the substance within the container from coming out.

In view of the above teachings obviously various modifications and variations of the present invention are possible without departing from the spirit and scope of the invention. Therefore, I do not wish to limit myself to the above disclosure, which is intended for the purpose of illustration and accordingly the invention may take other forms within the scope of the claims.

What is claimed as new is as follows:

1. In a heat producing package containing both a dry powder portion and a liquid portion normally kept separate therein, a heat producing composition wherein said dry powder portion comprises calcined kieserite, 0.5 to 7.5% iron oxide and 2 to 8% of a viscosity agent selected from the group consisting of carboxymethyl cellulose, bentonite, starch, flour and vermiculite and said liquid comprises water, there being from ½ to 2½ parts of liquid to each part of dry powder.

2. A heat producing composition, as described in claim 1 plus the addition of 0–6% of a wetting or a suspending agent selected from the group consisting of polyethylene glycol, and alkyl aryl sulfonates to the powder portion of the composition.

3. A heat producing composition as described in claim 1 plus the addition of 2–10% of an insulating agent selected from the group consisting of powdered asbestos, sand, sawdust and plaster of Paris to the powder portion of the composition.

4. A heat producing composition as specified in claim 1 including the addition of coloring to the liquid portion of the composition.

5. A heat producing composition as specified in claim 1 including the addition of 1–10% of freeze preventatives selected from the group consisting of sodium chloride and potassium chloride to the liquid portion of the composition.

References Cited

UNITED STATES PATENTS

| | | | |
|---|---|---|---|
| 1,819,807 | 8/1931 | Baysinger | 44—3 |
| 1,850,166 | 3/1932 | Bell | 44—3 |
| 2,157,169 | 5/1939 | Foster | 126—263 |
| 2,250,009 | 7/1941 | Coble | 44—3 |
| 2,531,359 | 12/1950 | Mace | 44—3 X |
| 2,800,456 | 7/1957 | Shepherd | 252—70 |
| 3,175,558 | 3/1965 | Caillouette et al. | 126—263 X |

FOREIGN PATENTS

| | | |
|---|---|---|
| 515,136 | 8/1955 | Canada. |
| 27,115 | 2/1899 | Great Britain. |

OTHER REFERENCES

Lange's Handbook of Chemistry, Handbook Publishers, Inc., Sandusky, Ohio, Sixth Edition (1946), p. 1467.

DANIEL E. WYMAN, *Primary Examiner.*

C. F. DEES, *Assistant Examiner.*